(12) United States Patent
Huang et al.

(10) Patent No.: US 12,071,190 B2
(45) Date of Patent: Aug. 27, 2024

(54) SCOOTER STEERING LOCK

(71) Applicant: Razor USA LLC, Cerritos, CA (US)

(72) Inventors: Joey Chih-Wei Huang, Temple City, CA (US); Robert Chen, San Marino, CA (US)

(73) Assignee: Razor USA LLC, Cerritos, CA (US)

( * ) Notice: Subject to any disclaimer, the term of this patent is extended or adjusted under 35 U.S.C. 154(b) by 983 days.

(21) Appl. No.: 16/585,840

(22) Filed: Sep. 27, 2019

(65) Prior Publication Data

US 2020/0102032 A1 Apr. 2, 2020

Related U.S. Application Data

(60) Provisional application No. 62/792,327, filed on Jan. 14, 2019, provisional application No. 62/738,535, filed on Sep. 28, 2018.

(51) Int. Cl.
| | |
|---|---|
| *B62H 5/06* | (2006.01) |
| *B62H 5/04* | (2006.01) |
| *B62H 5/20* | (2006.01) |
| *B62K 3/00* | (2006.01) |

(52) U.S. Cl.
CPC .............. *B62H 5/06* (2013.01); *B62H 5/04* (2013.01); *B62H 5/20* (2013.01); *B62K 3/002* (2013.01)

(58) Field of Classification Search
CPC ............... B62H 5/06; B62H 5/04; B62H 5/20
See application file for complete search history.

(56) References Cited

U.S. PATENT DOCUMENTS

| | | | | |
|---|---|---|---|---|
| 1,380,720 A | | 6/1921 | Johnson | |
| 3,863,472 A | * | 2/1975 | Klingfus | B62H 5/06 70/186 |
| 4,509,349 A | * | 4/1985 | Partridge | B62H 5/06 70/185 |
| 5,085,063 A | * | 2/1992 | Van Dyke | B62H 5/04 70/389 |
| 5,251,464 A | | 10/1993 | Halter | |

(Continued)

FOREIGN PATENT DOCUMENTS

| | | |
|---|---|---|
| CN | 214607799 U | 11/2021 |
| DE | 3103784 A1 | 1/1982 |

(Continued)

OTHER PUBLICATIONS

International Preliminary Report on Patentability in International Patent Application No. PCT/US2019/053427, dated Mar. 23, 2021, in 7 pages.

(Continued)

*Primary Examiner* — Tony H Winner
(74) *Attorney, Agent, or Firm* — Knobbe, Martens, Olson & Bear, LLP

(57) ABSTRACT

A locking mechanism can be used for securing a scooter or other vehicle. The locking mechanism can secure a wheel of the scooter in a left or right steering position. The locking mechanism can be manually actuated by the user, such as by a foot or hand of the user. Once the wheel is secured in place, the scooter may be difficult to ride without unlocking. The locking mechanism can be unlocked through a wireless connection with a remote control (e.g. a phone).

15 Claims, 18 Drawing Sheets

(56) References Cited

U.S. PATENT DOCUMENTS

| | | | | |
|---|---|---|---|---|
| 5,974,843 A * | 11/1999 | Burkholder | ............. | B62H 5/06 70/185 |
| 6,076,381 A * | 6/2000 | Green | ............. | B62H 5/06 70/186 |
| 6,082,754 A * | 7/2000 | Jeunet | ............. | B62K 9/00 280/272 |
| 6,378,884 B1 * | 4/2002 | Kettler | ............. | B62K 21/02 74/495 |
| 8,132,437 B1 | 3/2012 | Chen | | |
| 8,854,207 B2 | 10/2014 | Williams | | |
| 10,538,285 B2 * | 1/2020 | Mori | ............. | B62H 5/04 |
| 2009/0272594 A1 | 11/2009 | Bussinger | | |
| 2012/0068433 A1 | 3/2012 | Eliasson | | |
| 2018/0244329 A1 | 8/2018 | Mori et al. | | |
| 2018/0354570 A1 | 12/2018 | Mori et al. | | |
| 2019/0248439 A1 | 8/2019 | Wang | | |
| 2022/0185409 A1 | 6/2022 | Guo et al. | | |

FOREIGN PATENT DOCUMENTS

| | | |
|---|---|---|
| DE | 3330840 A1 | 3/1985 |
| DE | 4222526 A1 | 11/1992 |
| DE | 102014006858 A1 | 11/2015 |
| EP | 1724165 A1 | 11/2006 |
| EP | 2168849 A1 | 3/2010 |
| EP | 2418343 B1 | 9/2016 |
| EP | 3228789 A1 | 10/2017 |
| GB | 475605 A | 11/1937 |
| GB | 2358007 A | 7/2001 |
| KR | 10-2017-0078019 A | 7/2017 |
| RU | 2712145 C1 | 1/2020 |
| TW | 201730036 A | 9/2017 |
| WO | WO 2015/161365 A1 | 10/2015 |
| WO | WO 2017/217936 A1 | 12/2017 |
| WO | WO 2020/069299 A1 | 4/2020 |
| WO | WO 2022/125821 A1 | 6/2022 |

OTHER PUBLICATIONS

International Search Report and Written Opinion in corresponding International Patent Application No. PCT/US2019/053427, dated Dec. 16, 2019, in 13 pages.

Partial Supplementary Search Report in corresponding European Patent Application No. 19867332.9, dated May 4, 2022, in 13 pages.

Extended Search Report in corresponding European Patent Application No. 19867332.9, dated Aug. 26, 2022, in 12 pages.

GoTrax G4 Review: The Best Electric Scooter from GoTrax, viewed on internet on Feb. 15, 2022, https://www.youtube.com/watch?v=cGQmvV1LhMw>, Oct. 1, 2020, in 51 pages.

Office Action in corresponding Japanese Patent Application No. 2021-517649, dated Jun. 19, 2023, in 6 pages.

Office Action in corresponding Japanese Patent Application No. 2021-517649, dated Dec. 18, 2023, in 5 pages.

* cited by examiner

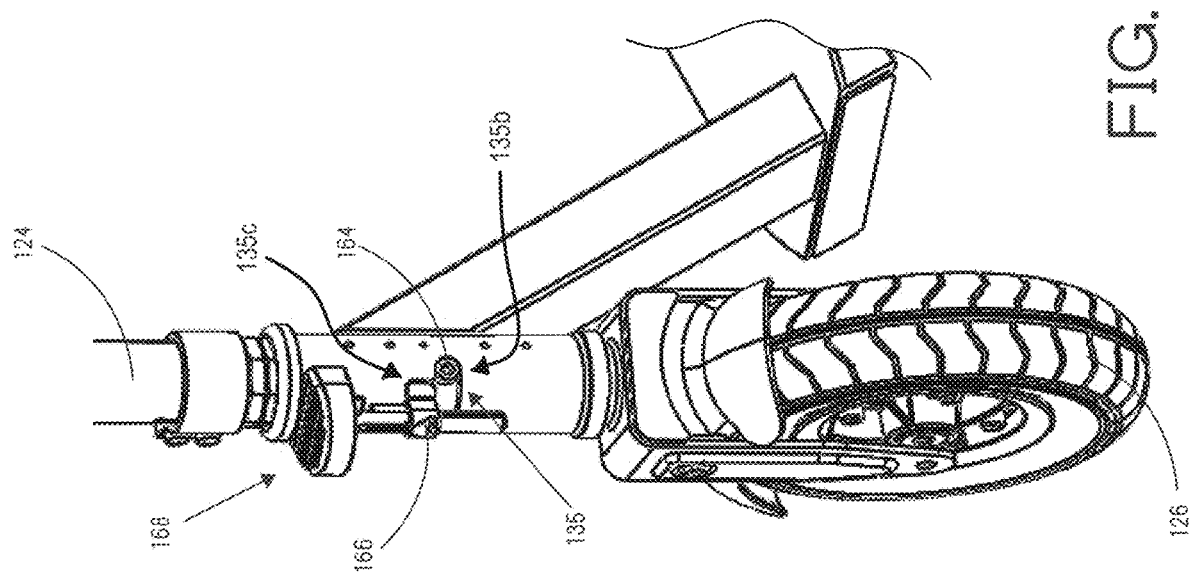

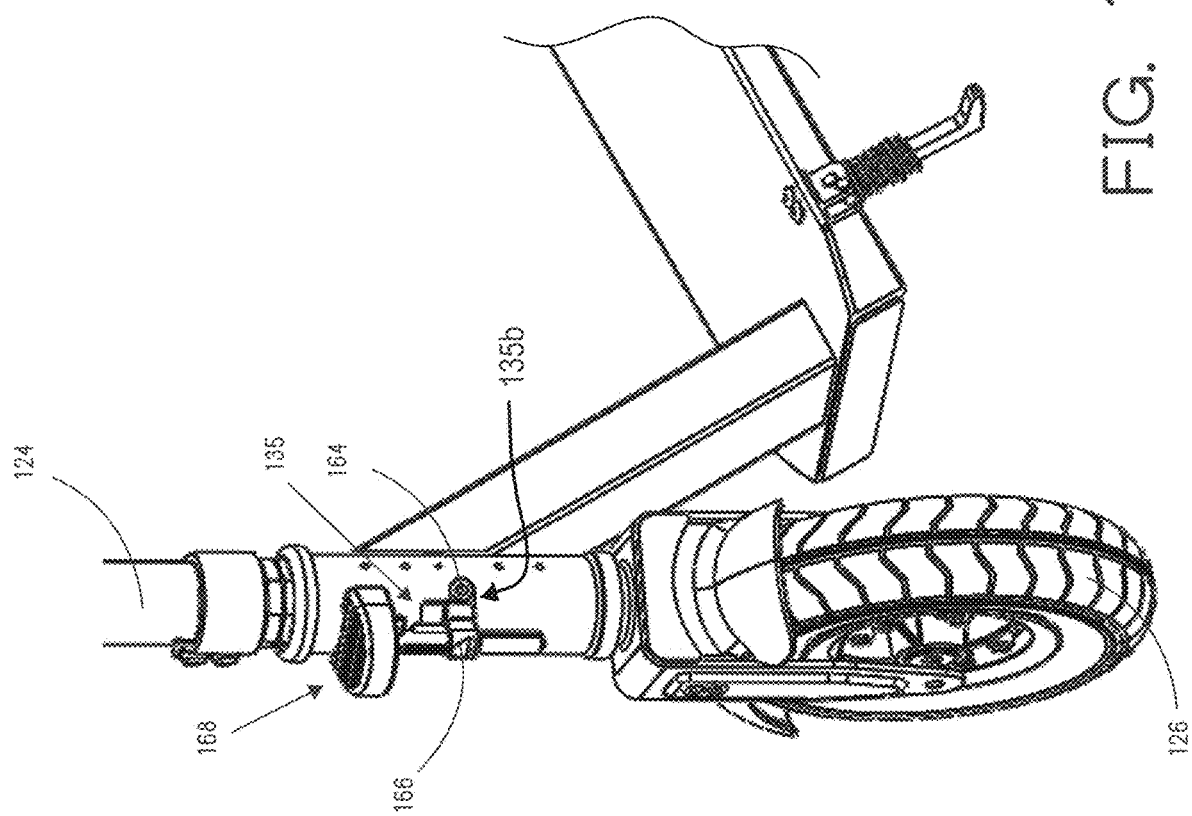

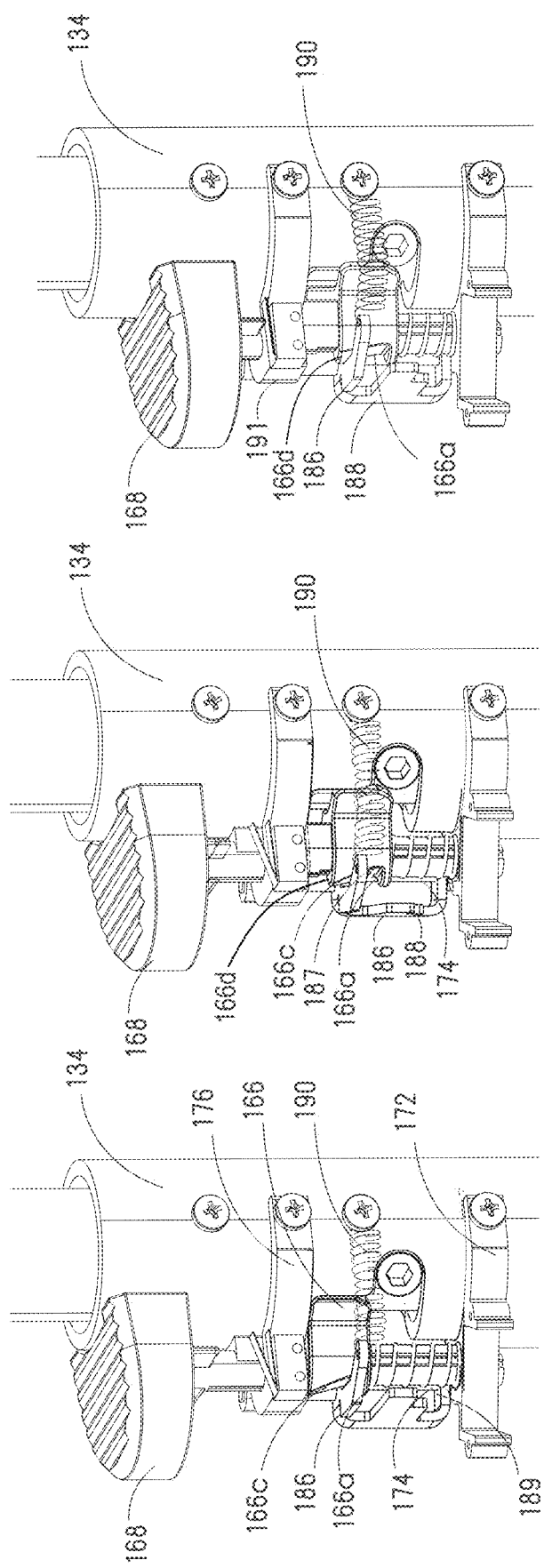

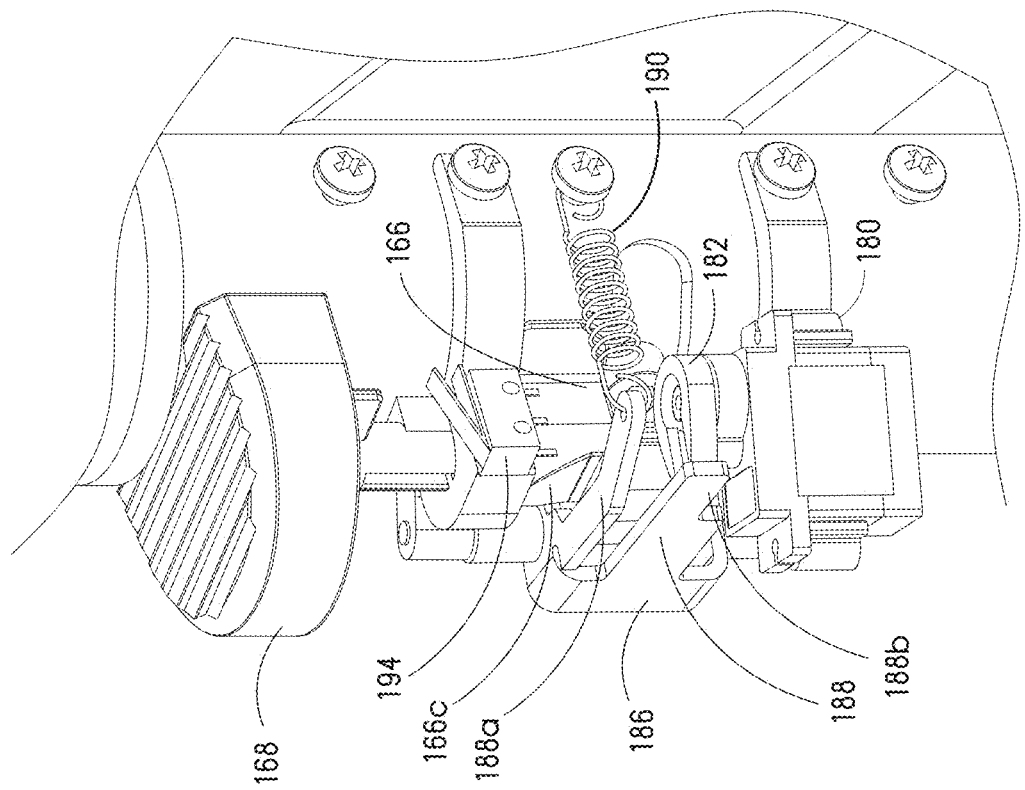
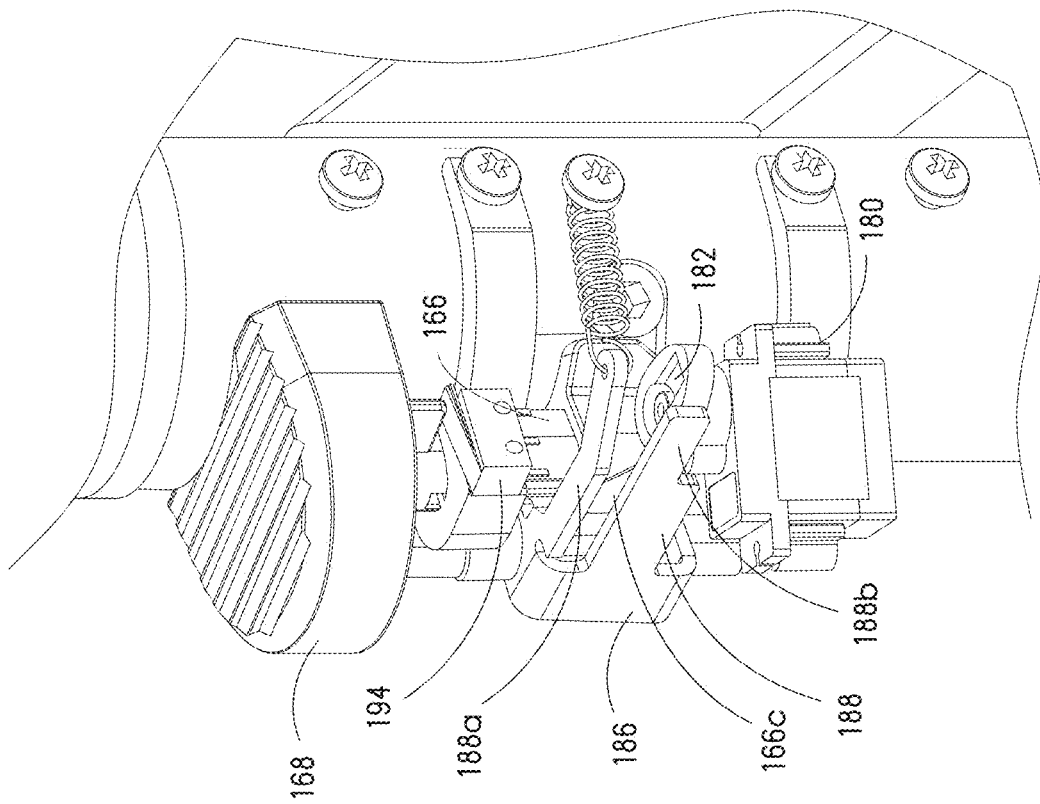

SCOOTER STEERING LOCK

CROSS REFERENCE

This application claims the benefit of U.S. Patent Application No. 62/738,535, filed Sep. 28, 2018, and U.S. Patent Application No. 62/792,327, filed Jan. 14, 2019, each of which are hereby incorporated by reference in their entirety.

BACKGROUND

Field

This disclosure generally relates to steerable personal vehicles such as two, three and four-wheeled scooters and other personal vehicles.

Certain Related Art

Scooters and other personal vehicles (referred to herein generically as "scooters") come in both motorized and non-motorized types and have been popular for decades as lightweight, alternative means of transportation. The portability of scooters provides many advantages. Scooters can be convenient to park, carry or stow when not in use and can be easily deployable again for riding.

SUMMARY OF CERTAIN FEATURES

Despite the above-mentioned conveniences, scooters can also have certain downsides. For example, certain establishments or businesses do not allow scooters to be taken indoors. In this situation and in many others, the scooter can be left unattended by the user. While precautions can be taken to prevent theft, such as chaining the scooter to an immovable object, such precautions are not always feasible or convenient. The scooter may not be designed for use with a chain, finding an appropriate immovable object can be problematic, carrying the chain and/or securing the scooter to the immovable object may be inconvenient, and/or the user may be too hurried or careless to properly secure the scooter. Indeed, some scooters are rented (e.g., on a short-term and/or shared basis), so the user of the scooter may not be the owner of the scooter, which may make it less likely that the user will properly secure the scooter—especially if securing the scooter is time consuming and/or inconvenient. Scooters left unattended for limited or extended times can be subject to theft or unauthorized use. Accordingly, there exists a need for a securing mechanism that enables the scooter to be quickly and conveniently secured, that does not require the user to obtain and/or carry a separate chain, and/or that functions without the need for an immovable object in the environment. The present disclosure describes steerable personal vehicles (e.g., scooters) with features that address one or more of the aforementioned problems, or other problems.

One aspect of the present disclosure is an improved locking mechanism for securing a scooter in a quick and convenient manner. The locking mechanism can be attached to a scooter steering assembly. The scooter steering assembly can include a wheel of the scooter that is steerable. The wheel can be steered into a left or right steering position and locked in place by the locking mechanism. The locking mechanism can be manually actuated by the user, such as by a foot or hand of the user. Once the wheel is locked in place (e.g., in a turning position), the scooter may be difficult to ride without unlocking. Accordingly, the scooter can be a less desirable target for theft.

Another aspect of the present disclosure is that the locking mechanism can be unlocked to re-enable steering of the wheel of the scooter in a quick and reliable manner. The locking mechanism can be unlocked wirelessly using a remote control in the possession of the user. The remote control can be a smartphone or other mobile device running an application. The remote control can wirelessly connect with an electronic controller of the scooter. A signal from the remote control to the electronic controller can operate the locking mechanism to unlock itself. Another aspect of the present disclosure is that the locking mechanism cannot be unlocked without disassembly of the substantially entire locking mechanism, except by the remote control.

According to one implementation, a theft-deterring scooter includes a scooter body having a deck. A steering assembly couples with the scooter body. The steering assembly includes a steering column and a handlebar. A first wheel couples to the steering assembly. A second wheel couples to the scooter body. A steering lock is configured to be engaged by a user operating a mechanical actuator. The steering lock further is configured to be disengaged in response to receiving a wireless signal from a remote control. When the steering lock is engaged, the steering assembly is secured in one of a left position and a right position in which the first wheel is positioned at an angle that is offset from a center position in which the first wheel is aligned with a longitudinal axis of the scooter body.

According to another aspect, the scooter includes a header tube attached with the scooter body, the header tube rotatably couples with the steering assembly. An outer housing of the steering lock couples with the header tube.

According to another aspect, the scooter includes a locking recess in the header tube. A locking shaft is mounted within the header tube and rotatable therein. A projection extends from the locking shaft and into the locking recess. The locking shaft forms part of the steering assembly.

According to another aspect, the locking recess further includes a wing portion. The wing portion sized to accommodate the projection when the steering assembly is in the left or right position.

According to another aspect, the scooter includes a lock actuator. The lock actuator includes an engagement member at least partially disposed within the locking recess. When the lock actuator is in an unlocked state, the locking shaft can rotate and when the lock actuator is in a locked state the engagement member traps the projection within the wing portion and prevents rotation of the locking shaft.

According to another aspect, the scooter includes a latch, the latch is configured to engage a shelf of the lock actuator in the locked state.

According to another aspect, the latch is spring loaded.

According to another aspect, the scooter includes a servo-motor having a cam. The servo-motor and cam is configured to engage the latch to release the lock actuator from the locked state, The servo-motor is actuatable based on a signal from a controller in response to the wireless signal from the remote control.

According to another aspect, the scooter is non-motorized.

According to one implementation, a scooter includes a steering assembly includes a wheel, and a scooter body. A locking mechanism is configured to secure the steering mechanism in a locked position relative to the scooter body, The locking mechanism includes a header tube includes a locking recess. A locking shaft positioned at least partly in the header tube, the locking shaft includes a projection. The locking shaft connects with the wheel such that the locking shaft and wheel are configured to rotate together as a unit. A lock actuator includes an engagement member extending laterally therefrom. The projection is disposed within the locking recess of the header tube. The lock actuator is configured to move between a first position and a second position. In the first position, the lock actuator is configured to allow rotation of the locking shaft. In the second position, the lock actuator is configured to engage within the locking recess, thereby inhibiting rotation of the locking shaft.

According to another aspect, the locking recess comprises a wing portion configured to receive the projection, and in the second position of the lock actuator. The engagement member traps the projection within the wing portion.

According to another aspect, the scooter includes an upper support and a lower support. The upper and lower supports couple with the header tube. The lock actuator slidingly engages with the upper and lower supports between the first and second positions.

According to another aspect, the scooter includes a latch that is rotatable about a pin and configured to engage with a shelf of the lock actuator to retain the lock actuator in the second position.

According to another aspect, the scooter includes an actuator that is configured to disengage the latch from the shelf of the lock actuator to release the lock actuator from the second position.

According to another aspect, the actuator is a servo-motor having a cam.

According to another aspect, the actuator is actuated in response to a wireless signal from a remote control.

According to another aspect, the scooter includes an outer housing having first and second housing components forming an enclosure that are configured to couple with the header tube. The lock actuator extends from the enclosure.

According to another aspect, the second position of the lock actuator locks the steering assembly into one of a left and a right position. When the steering assembly is in each of the left and the right positions, the wheel is aligned at an angle with respect to a center position of the first wheel.

The summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

FIG. 12C shows a partially assembled view of the scooter in the left steering position in the unlocked state;

FIG. 12D shows a partially assembled view of the scooter in the left steering position in the locked state;

FIG. 14A shows a partially assembled view of the locking mechanism in the unlocked state;

FIG. 14B shows a partially assembled view of the locking mechanism in transition between the locked and unlocked states;

FIG. 14C shows a partially assembled view of the locking mechanism in the locked state;

FIG. 15A shows a partially assembled view of the locking mechanism in the locked state; and FIG. 15B shows a step for unlocking the locking mechanism from the locked state.

DETAILED DESCRIPTION OF CERTAIN EMBODIMENTS

The various features and advantages of the systems, devices, and methods of the technology described herein will become more fully apparent from the following description of the embodiments illustrated in the figures. These embodiments are intended to illustrate the principles of this disclosure. This disclosure should not be limited to only the illustrated examples. The features of the illustrated embodiments can be modified, combined, removed, and/or substituted as will be apparent to those of ordinary skill in the art upon consideration of the principles disclosed herein.

Overview

Figure 1:
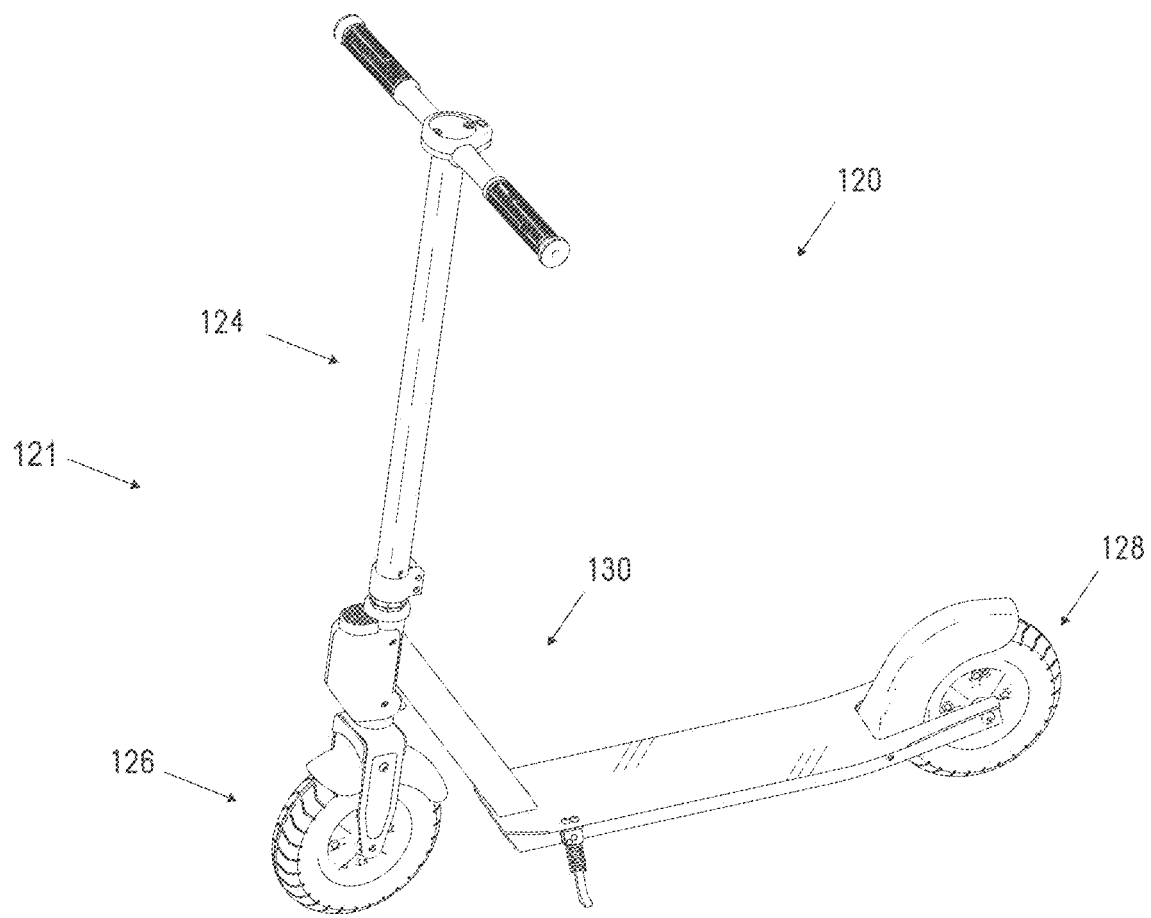
FIG. 1 shows an illustrative embodiment of a scooter.
Figure 2:
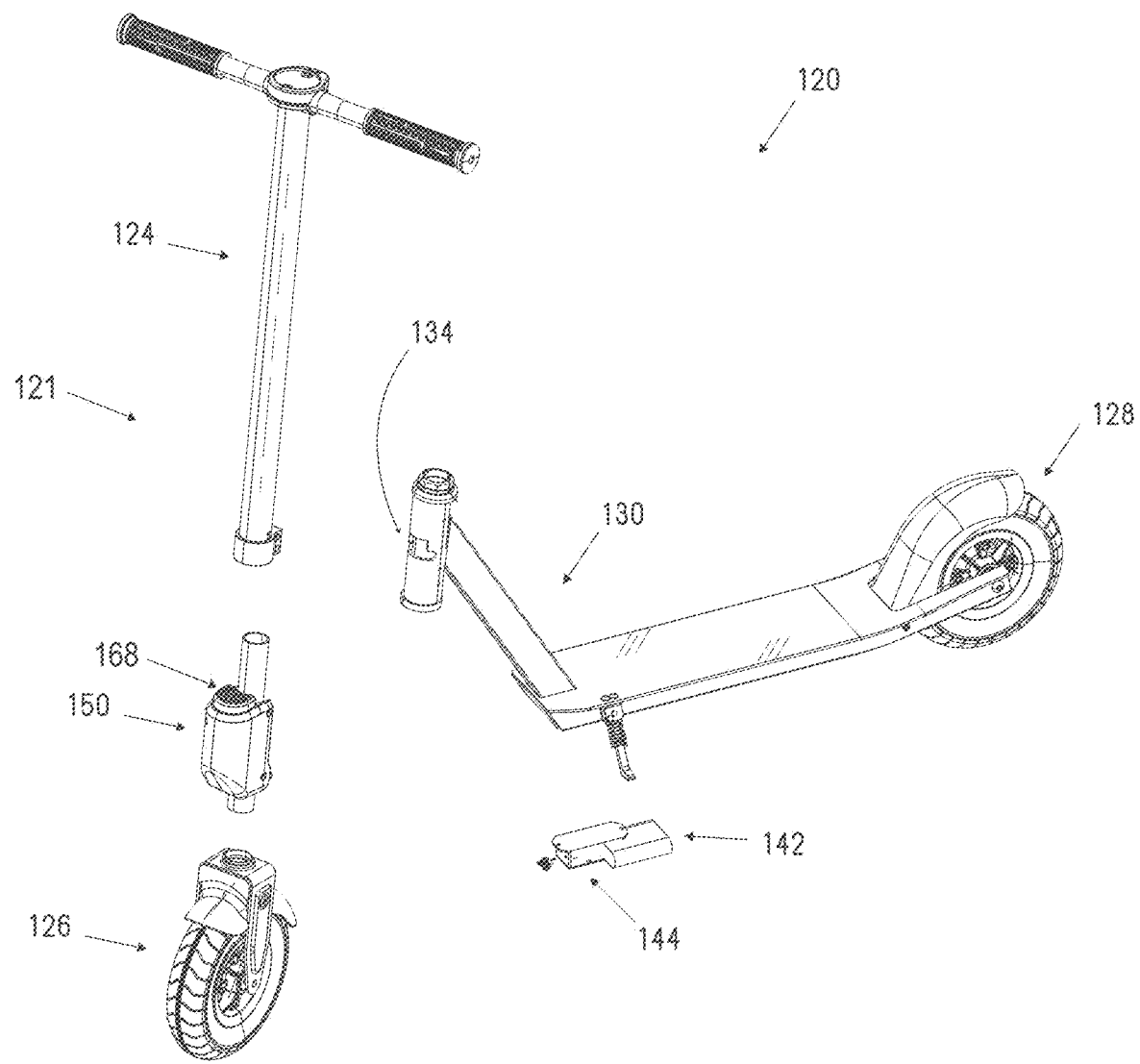
FIG. 2 shows an exploded view of the scooter.

In some implementations, the steerable personal vehicle can comprise a scooter 120, such as is illustrated in FIGS. 1 and 2. The scooter 120 can be a powered (e.g., electrically powered) or manual (e.g., kick) scooter. Although described herein in context of the scooter 120 having a steering assembly 121 at the front, the concepts, features, and improvements described herein can be applied to other types of vehicles and steering arrangements, including powered scooters, bikes, tricycles, quadracycles, drift carts, or other personal vehicles. In some embodiments, the concepts, features, and improvements described herein are used on a self-balancing vehicle (e.g., as described in U.S. Patent Application Publication No. 2019/0077479, the entirety of which is hereby incorporated by reference herein). For example, the locking mechanism can be incorporated into the self-balancing vehicle and configured to lock the movable platforms of the device relative to each other.

The scooter 120 can have a front wheel 126 and a rear wheel 128. The front and/or rear wheels 126, 128 can be any type of wheel suitable for use in a scooter. In certain variants, the front and/or rear wheels 126, 128 comprise a caster wheel. The wheels can be made of urethane, rubber, plastic, or other material. The wheels can be pneumatic, unitary, or another design. The front and/or rear wheels 126, 128 can comprise different dimensions and/or different materials. For example, the diameter of the front wheel 126 can be larger than the diameter of the rear wheel 128, or vice versa. The front and/or rear wheels 126, 128 can include in-wheel hub motors. The front and/or rear wheels 126, 128 can include rotor shafts to support rotation. The front and/or rear wheels 126, 128 can include one or more bearings to reduce friction during rotation.

The front and/or rear wheels 126, 128 can be mounted on a scooter body 130 (e.g., by the rotor shafts and/or bearings). The scooter body 130 can include a deck (e.g., a flattened surface) on which a user can place his body (e.g., feet) while piloting the scooter 120. The scooter body 130 can include a kickstand, fenders for the front or rear wheels 126, 128 and/or other convenient features. The scooter body 130 can comprise plastic, metal, a composite, or other material type. The scooter body 130 can be an assembly or formed of a unitary material.

The scooter 120 can include a power source, such as a battery 142. The battery 142 can be any type of battery, such as lithium-ion, polymer-ion, lead-acid, or other battery type. The battery 142 can be rechargeable and include one or more ports for connecting with an external power source to provide charge to the battery 142. The battery 142 can be used to power various electronic components of the scooter 120, such as the in-wheel hub motors. The scooter can include a solar panel operative to charge the battery 142.

The scooter 120 can include the steering assembly 121. The steering assembly 121 can include a steering column 124. The front wheel 126 can be connected with the steering column 124. The front wheel 126 can be steerable with respect to the body 130 by rotation of the steering column 124. The steering assembly 121 can include a pair of handlebars attached to the steering column 124. The steering assembly 121 can include a header tube 134. The steering column 124 and the front wheel 126 can attach with the scooter body 130 at the header tube 134. The header tube 134 can include a generally hollow cylindrical portion. The steering column 124 can rotatably fit within the hollow cylindrical portion of the header tube 134. The steering assembly 121 can enable a user to steer or navigate the scooter 120 by turning the front wheel 126 in the direction of desired travel.

The steering assembly 121 can include a locking mechanism 150. The locking mechanism 150 can attach with the steering column 124, front wheel 126, and/or header tube 134. The locking mechanism 150 can secure the steering assembly 121 in a locked position, such as a left or right steering position. In the locked position, the wheel 126 can be oriented at an angle $\alpha$ with respect to a longitudinal axis A of the body 130. The angle $\alpha$ can be at least about: 5°, 10°, 15°, 20°, 30°, 45°, or otherwise. In the locked position, the he steering assembly 121 can be rotationally offset from a centered position of the steering assembly 121. In the centered position, the front wheel 126 can be aligned in a forward facing direction, aligned with the longitudinal axis A of the body 130, and/or aligned with a direction of the rear wheel 128. In some implementations, in the locked position, an axis of rotation (e.g., an axle) of the wheel 126 is not perpendicular to the longitudinal axis A and/or in the centered position the axis of rotation of the wheel 126 is perpendicular to the longitudinal axis A. In several variants, when in the locked position, the scooter 120 cannot be driven in a straight line because the wheel 126 is turned from a straight position (e.g., not parallel with the longitudinal axis A). When the locking mechanism 150 is in an unlocked state, the wheel 126 can be turned to be parallel with the longitudinal axis A of the body 130, thereby enabling the scooter 120 to be driven in a straight line.

Figure 3A:
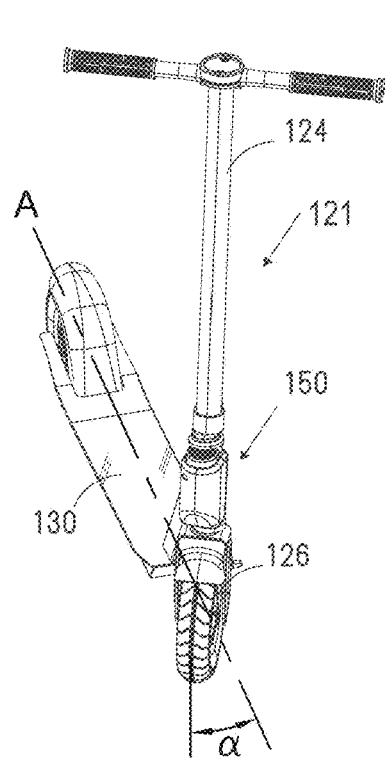
FIG. 3A shows a left steering position of a steering assembly of the scooter.
Figure 3B:
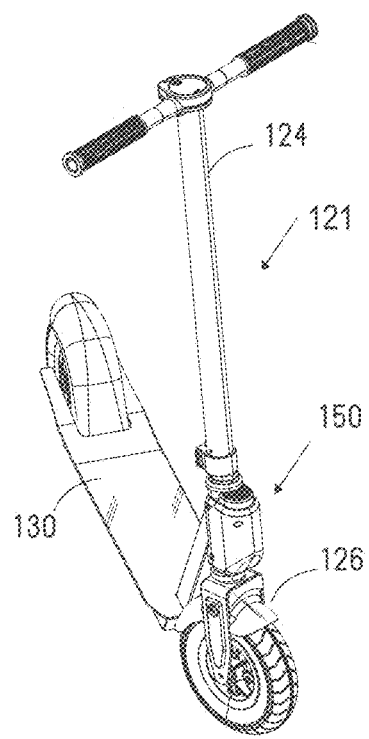
FIG. 3B shows a right steering position of a steering assembly of the scooter.
Figure 3C:
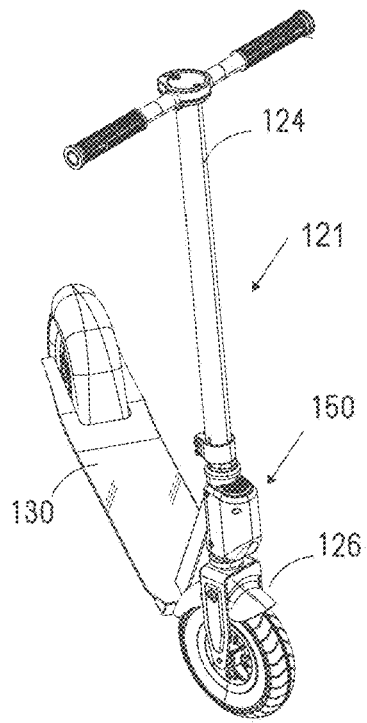
FIG. 3C shows a locked state of a steering assembly of the scooter.

FIGS. 3A and 3B illustrate the front wheel 126 steered into right and left steering positions, respectively. Steering the scooter 120 during forward motion using the steering assembly 121 is possible when the locking mechanism 150 is in an unlocked state. When the locking mechanism 150 is in a locked state, such as is shown in FIG. 3C, the steering assembly is locked into the left or right steering position. The locking mechanism can include a lock actuator 168, such as a button, lever, switch, or otherwise. The lock actuator 168 can be located at or near a top end of the locking mechanism 150.

An effect of locking the front wheel 126 with the locking mechanism 150 is that in the locked state, the scooter 120 is difficult to maneuver in use. In certain implementations, the scooter 120 is locked into a single steering direction and unable to turn to the opposite direction or to proceed in a straight line. When locked, the locking mechanism 150 frustrates normal usage of the scooter 120 and has the intended effect of deterring theft of the scooter 120.

Electronic Controls

Figure 4:
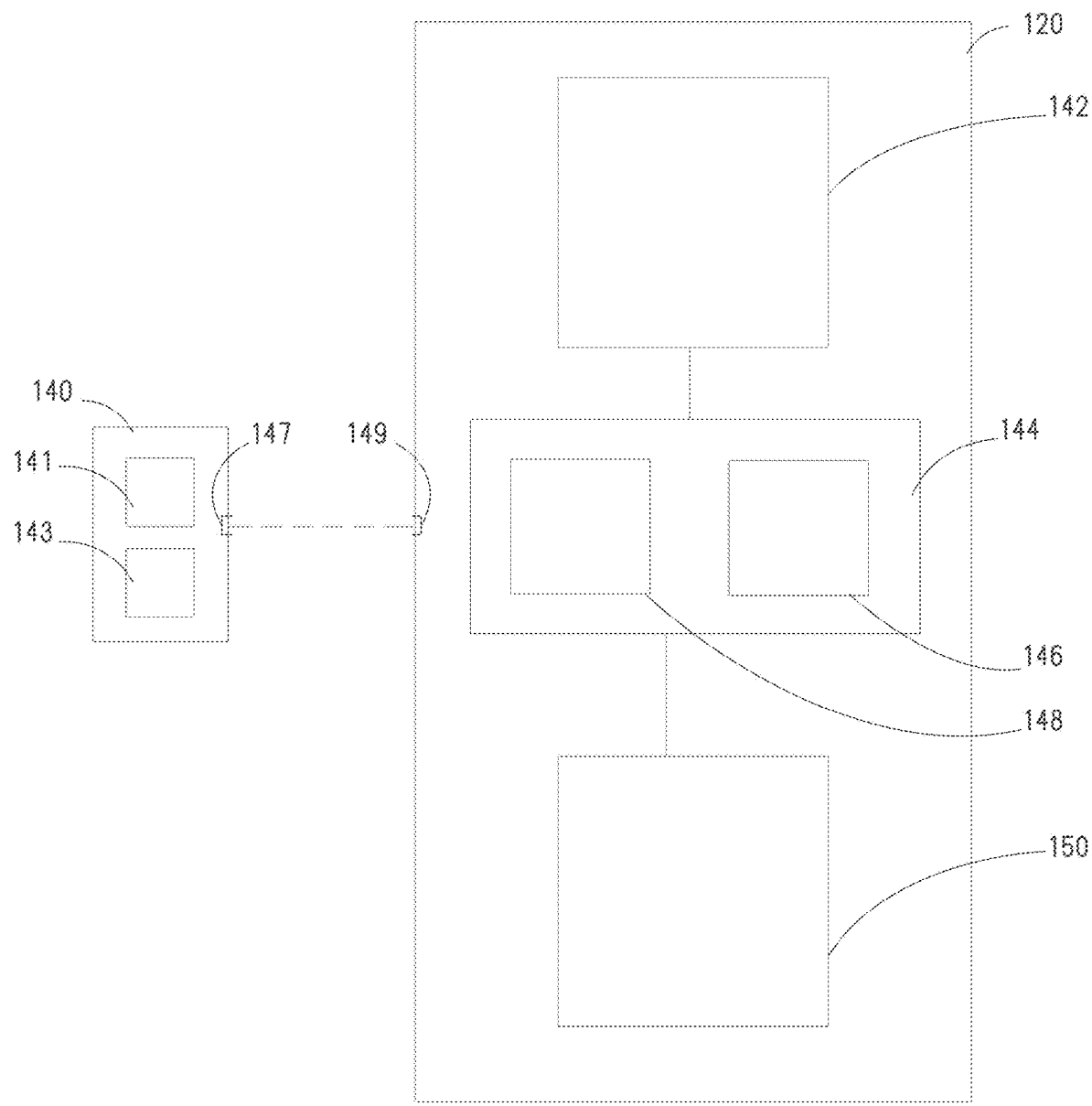
FIG. 4 shows a schematic block diagram of a communication and control system for the scooter.

FIG. 4 schematically illustrates control elements that can be associated with the scooter 120. The controls can be electronic controls. As discussed in more detail below, the controls can govern locking and/or unlocking of the scooter 120.

In some implementations, the locking mechanism 150 can be operated through a remote control 140. The remote control 140 can be a transponder control, a smart phone running an application, or another device. The remote control 140 can include a wireless antenna 147. The remote control 140 can wirelessly communicate with a controller 144 of the scooter 120. The controller 144 can include an antenna 149. The antennas 147, 149 can be any suitable type, including a trace antenna, coil antenna, or other antenna type for connecting wirelessly with the remote control 140. The connection between the remote control 140 can be through a standardized wireless connection, such as BLUETOOTH®, WI-FI, infrared, or other suitable wireless communication protocol.

The remote control 140 can include a processor 141 and a computer-readable storage unit 143. The storage unit 143 can include instructions that when executed can send a signal from the remote controller 140 to controller 144 to lock or unlock the locking mechanism 150. The controller 144 can include a processor 148 and a storage unit 146 with instructions stored thereon that when executed receive the signal from the remote control and send a lock or unlock signal to the locking mechanism 150 in response to the signal from the remote control 140. The battery 142 can provide power to the controller 144 and/or the locking mechanism 150 to execute the locking and/or unlocking operation using the mechanism described below.

The instructions on the storage unit 146 of the controller 144 can include consideration of various factors for unlocking or locking the locking mechanism 150. The instructions on the storage unit 146 can include whether to unlock the locking mechanism 150 based on receipt of a key or other security protocol in the signal from the remote control 140. The key or security protocol can verify the authorization of the remote control 140 to unlock the scooter 120. The remote control 140 can receive the key or security protocols from a connected server (e.g., through a wireless or cellular network). In one example, the remote control 140 requires a user to enter a passcode; the controller 144 can receive and verify authorization before unlocking or locking the locking mechanism 150. In certain examples, the remote controller must first obtain authorization (e.g., from a connected server) to send the signal to the scooter 120.

The instructions on the storage unit 146 of the controller 144 can include consideration of a state of the locking mechanism 150. The locking mechanism 150 can send a signal to the controller 144 indicating whether it is in the locked or unlocked states. The instructions cause the controller 144 to send the unlock signal if the locking mechanism is in the locked configuration and/or the remote control identity. The instructions cause the controller 144 to send the unlock signal if the locking mechanism is in the locked configuration.

According to one implementation, the use of the scooter 120 in conjunction with the remote control 140 and locking mechanism 150 can be as follows. A user can obtain authorization to use the scooter 120. The user can send a signal from the remoter controller 140 to the controller 144 of the scooter 120. The controller 144 can verify the authorization of the remoter controller 144. The controller 144 can unlock the locking mechanism 150. The user can ride the scooter 120 with full use of the steering assembly (e.g., the locking mechanism is an unlocked state). When the user has reached a location where the user wants to dismount and/or leave the scooter 120 unattended for a time, the user can turn the steering assembly into the left or right steering position and engage the locking mechanism 150 (e.g., manually and/or using the remote control 140). The locking mechanism 150 can lock the orientation of the front wheel 126 with respect to the scooter body 130 and thereby deter theft or use. Desirably, the locking mechanism 150 is not unlockable externally (e.g., the locking mechanism 150 is not unlockable manually without at least partial disassembly using one or more tools). In some embodiments, the locking mechanism automatically engages. For example, the locking mechanism can automatically engage after non-operation of the scooter 120 for a period of time (e.g., at least about: 1 minute, 3 minutes, 5 minutes, 10 minutes, or otherwise). Non-operation can be, for example, a lack of movement of the wheel 126 of the scooter 120, or otherwise.

When the user wants to again pilot the scooter 120, the user can use the remote control 140 to connect with the scooter 120 wirelessly. The remote control 140, for example, can be the smart phone of the user. The remote control 140 can be in wireless communication with the controller 144. The user can send a signal via the remote control 140 to the controller 144. The controller 144 can process the signal and send the unlock signal to the locking mechanism 150 (e.g., based on authorization of the remoter control 140 or user).

In this manner, the user can easily secure the scooter 120 and quickly unlock the scooter 120 for use using the remote control 140.

Locking Mechanism and Header Tube

Figure 5:
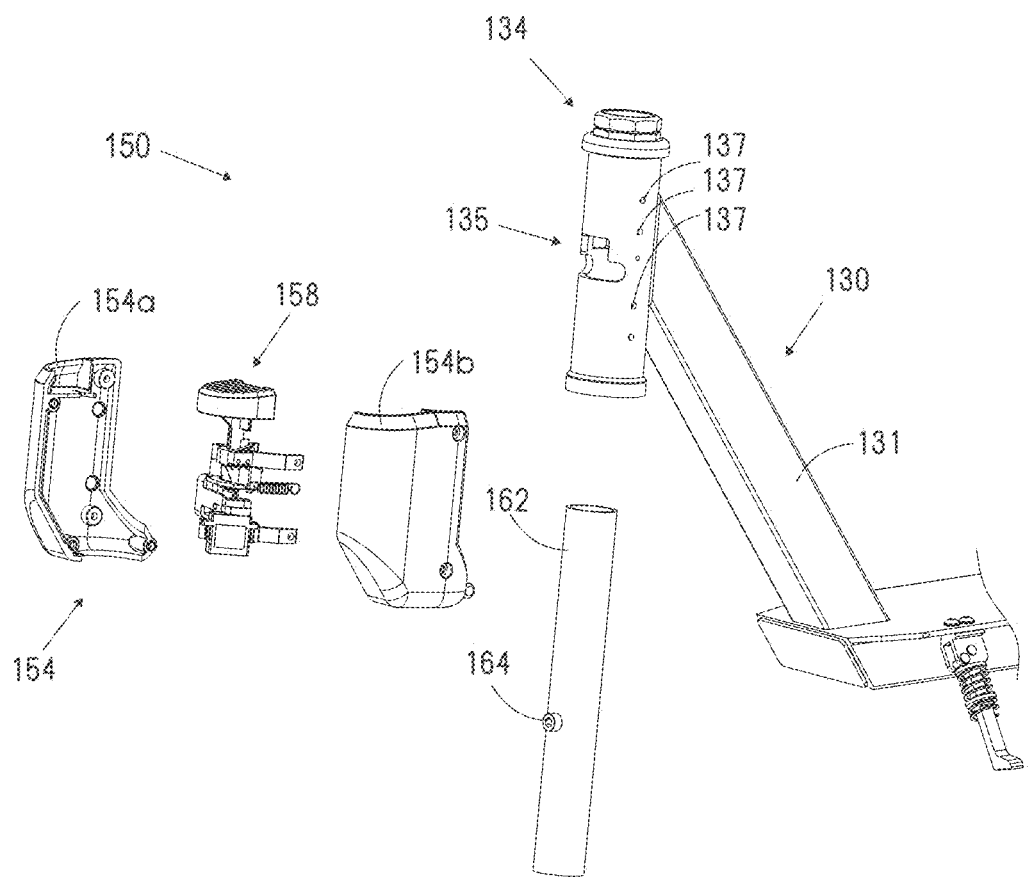
FIG. 5 shows an exploded view of a locking mechanism of the scooter.

FIG. 5 illustrates a partial exploded view of the locking mechanism 150 and the scooter body 130. The locking mechanism 150 can include an outer housing 154 and an internal assembly 158. The outer housing 154 can include one or more outer housing components 154a, 154b. The outer housing 154 can form an enclosure. The outer housing components 154a, 154b can fit together around the internal assembly 158. In some embodiments, a portion of the internal assembly 158 projects outward of and/or is not covered by the outer housing 154. For example, a portion of the lock actuator 168 can extend out of the outer housing 154 (see FIGS. 3A-3C), or otherwise be configured to enable a user to access the lock actuator. The outer housing 154 can be mounted to the header tube 134 at one or more mounting locations 137. The mounting locations 137 can be tapped screw holes, other mechanical connectors, welds, adhesive, or otherwise. A plurality of screws can be assembled through one or more portions of the outer housing 154 and into the mounting locations 137 to assemble the locking mechanism 150 with the header tube 134 and/or to assemble the housing components 154a, 154b together.

The locking mechanism 150 can include a locking shaft 162. The locking shaft 162 can be a cylindrical tube. The locking shaft 162 can assemble within the cylindrical portion of the header tube 134. The locking shaft 162 can extend from a portion of the steering assembly. The steering column 124 and/or the front wheel 126 can connect with the locking shaft 162. For example, a top end of the locking shaft 162 can rigidly connect to the steering column 124 and a bottom end of the locking shaft 162 can rigidly connect to the wheel 126 (e.g., to a fork of the wheel 126). The locking shaft 162 and the steering column 124 and/or the front wheel 126 can be configured to rotate together as a unit. In various embodiments, when the locking shaft 162 is locked (e.g., inhibited or prevented from rotating) with respect to the header tube 134, the steering column 124 and/or the front wheel 126 are also locked.

The locking shaft 162 can be configured to engage with the header tube 134. For example, locking shaft 162 can include a projection 164 that is received in a locking recess 135 in the header tube 134. The projection 164 can extend laterally from an outer surface of the locking shaft 162. In some implementations, the projection 164 can be a screw or a weld or other item attached with the locking shaft 162. The projection 164 can be assembled with the locking shaft 162. The locking shaft 162 can be fit within the cylindrical portion of the header tube 134 and rotatable therein.

The header tube 134 can be connected by a tube 131 to the rest of the scooter body 130, such as to the deck of the scooter. The tube 131 can be hollow. The tube 131 can be used to route one or more wires from the controller 144 to the locking mechanism 150. The wires can also include wires from the battery 142 to the locking mechanism 150.

Figure 6:
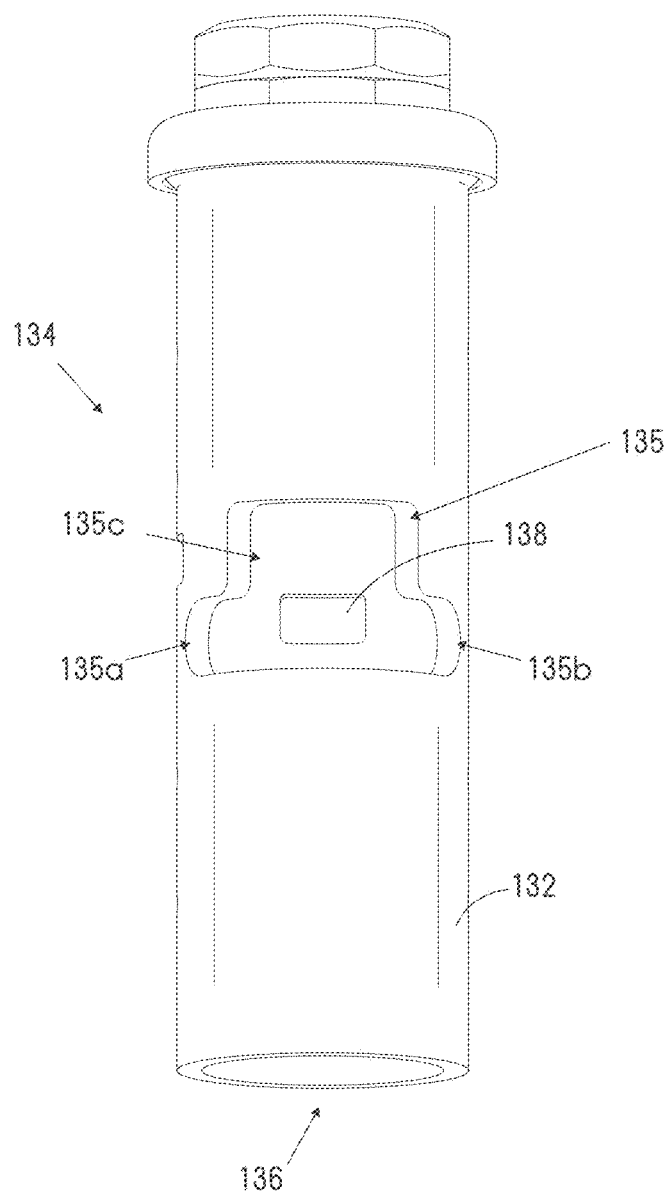
FIG. 6 shows a front view of a header tube of the scooter.

FIG. 6 further illustrates the header tube 134. The header tube 134 can include the generally cylindrical portion, although an outer cylindrical shape is not required. The generally cylindrical portion can include an internal space 136. The locking shaft 162 and/or the steering column 124 or portions thereof can be located within and/or rotate within the internal space 136 of the header tube 134 to allow for steering the front wheel 126 with respect to the body 130.

As previously mentioned, the header tube 134 can include the locking recess 135. The projection 164 can be located within the locking recess 135 when assembled with the locking shaft 162 in the header tube 134. The locking recess 135 can include one or more wings 135a, 135b for accommodating movement of the projection 164 within the locking recess 135 when the locking shaft 162 is rotated it is rotated. A width or arc dimension (e.g., along a circumference of the header tube 134) of the wing portions 135a, 135b can control the rotation limits of the steering assembly 121. A wider pair of wing portions 135a, 135b allow for wider, more turns of the wheel 126. A narrower pair of wing portions 135a, 135b allow less turning of the wheel 126. The locking recess 135 can include an upper portion 135c, which can be adjacent the wing portions 135a, 135b.

The header tube 134 can include a wiring aperture 138. Wiring can pass through the wiring aperture 138 to the battery 142 and/or controller 144. The aperture 138 can extend through the outer surface or cylindrical portion of the header tube 134. The wiring aperture 138 can align with the tube 131 and can be used to receive one or more wires into the locking mechanism 150. In various embodiments, all of the wiring for the controller 144 and the locking mechanism 150 can be kept internal to the structure of the scooter body 130.

Outer Housing of the of the Locking Mechanism

Figure 7A:
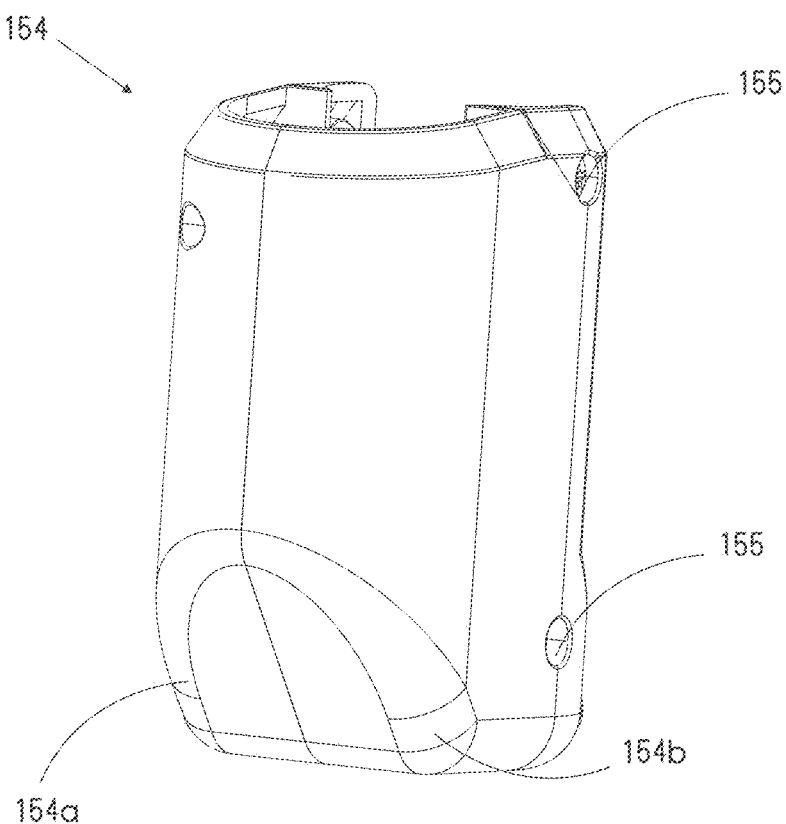
FIG. 7A shows a front perspective view of a housing of the locking mechanism.
Figure 7B:
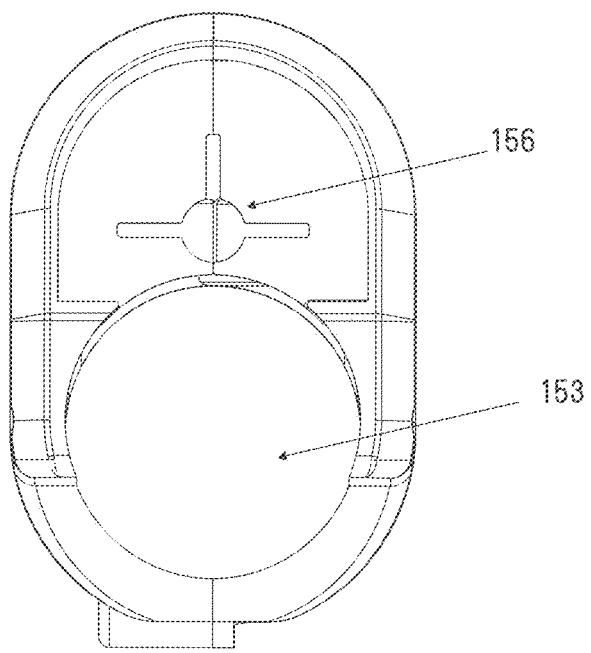
FIG. 7B shows a top view of the housing of the locking mechanism.
Figure 8:
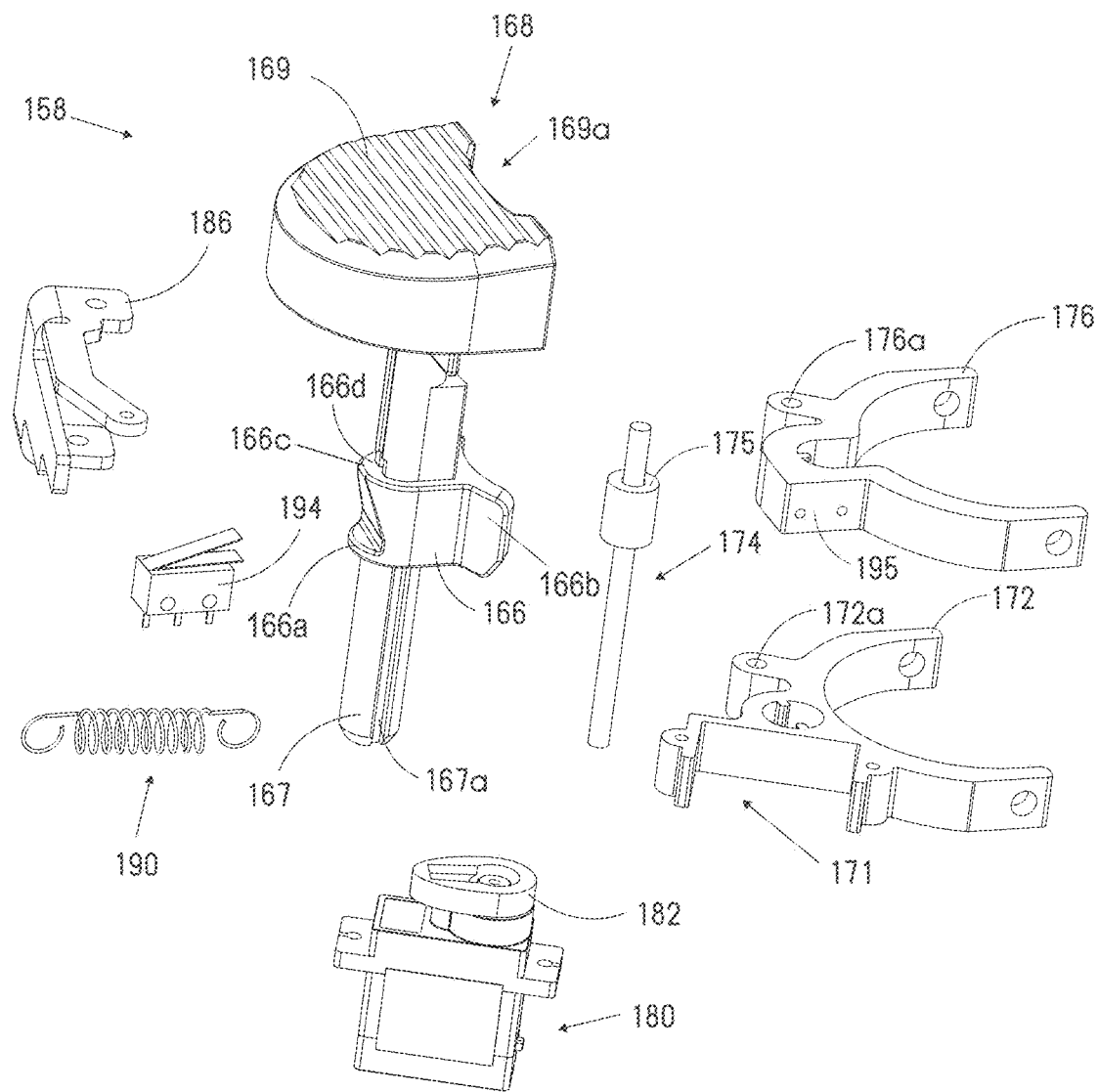
FIG. 8 shows an exploded view of a portion of the locking mechanism.
Figure 9A:
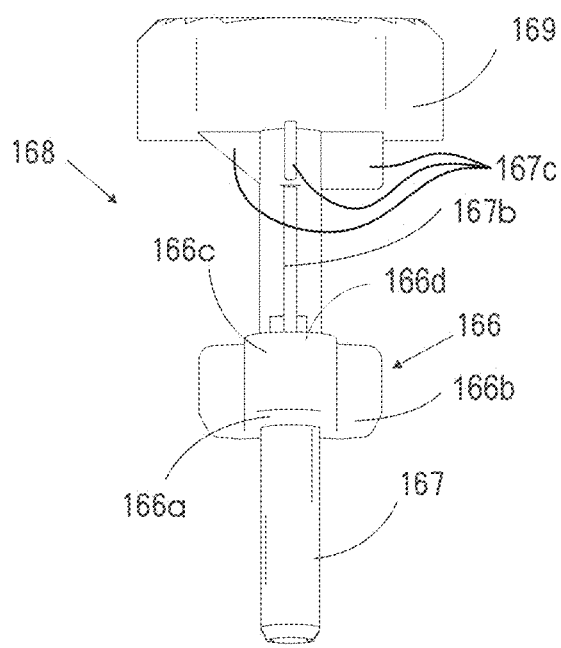
FIG. 9A shows a front view of a locking stem of the locking mechanism.
Figure 9B:
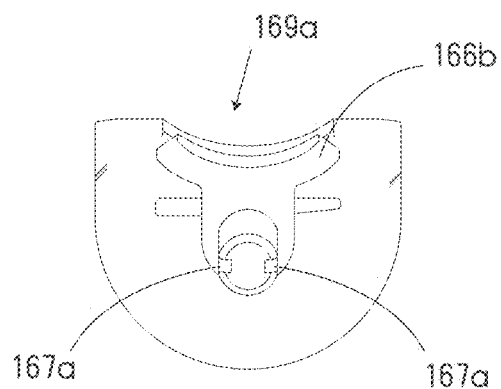
FIG. 9B shows a top view of the locking stem of the locking mechanism.
Figure 10A:
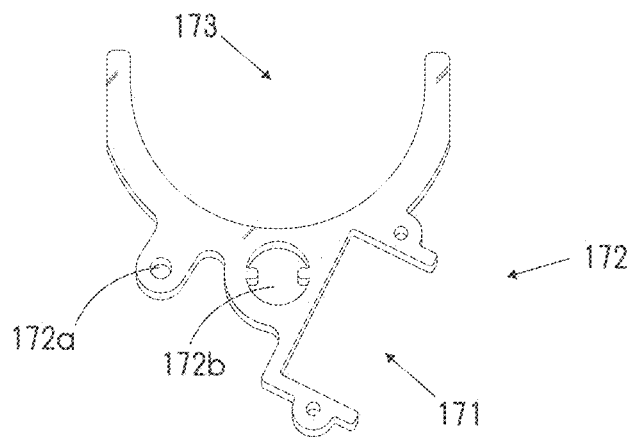
FIG. 10A shows a first support for the locking stem.
Figure 10B:
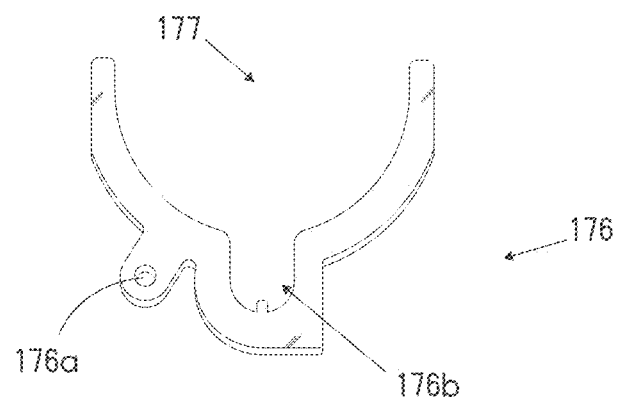
FIG. 10B shows a second support for the locking stem.
Figure 11A:
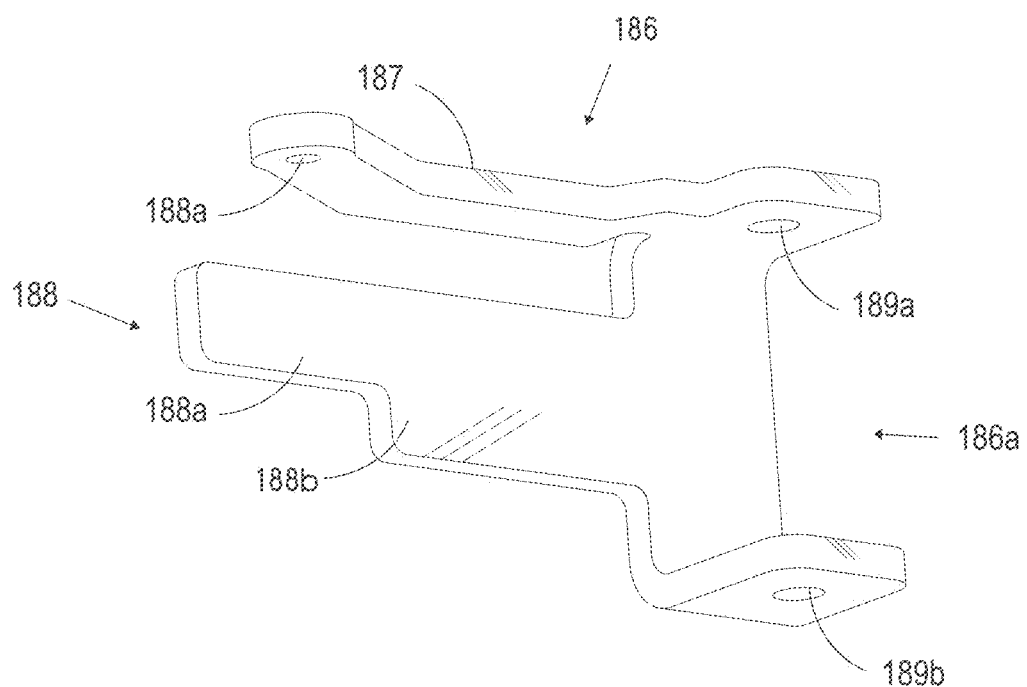
FIG. 11A shows a rear view of a latch mechanism of the locking mechanism.
Figure 11B:
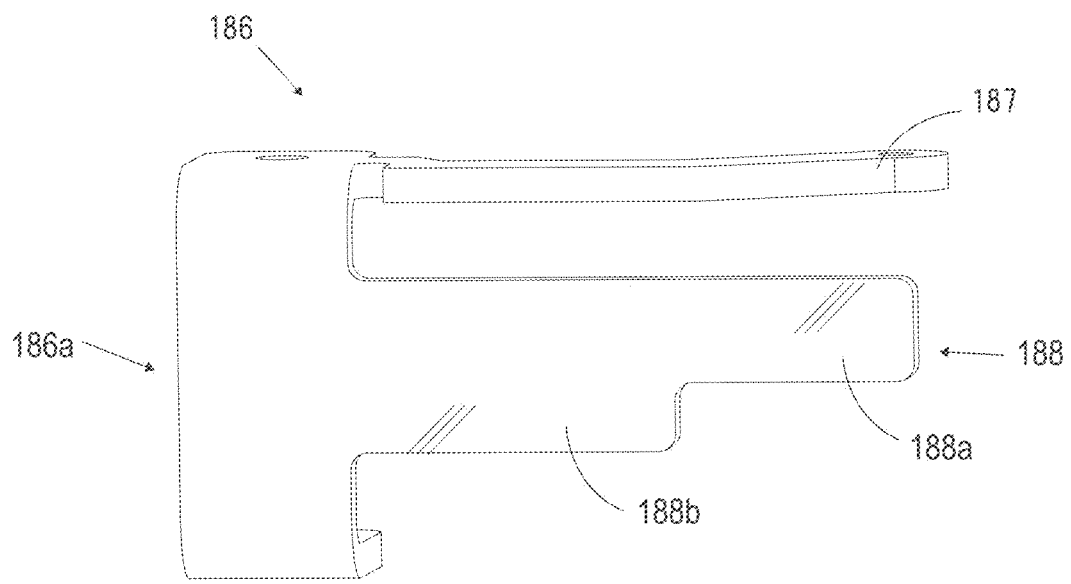
FIG. 11B shows a front view of the latch mechanism of the locking mechanism.

FIGS. 7A and 7B illustrate further details of the outer housing 154. The outer housing 154 can be shaped so as to form a generally enclosed interior space. The enclosed interior space can contain or partially contain the interior assembly 158. The interior components assembly 158 can be protected from damage or unauthorized manipulation by the outer housing 154. The components 154a, 154b can include one or more coupling locations 155. Coupling locations 155 can receive one or more screws or bolts or similar mechanical couplers for attaching together the housing components 154a, 154b. The coupling locations 155 can also be used to attach the housing 154 with the header tube assembly 134.

The outer housing 154 can include an aperture 153. The aperture 153 can be sized and/or shaped to correspond to an outer profile on the header tube 134. The fitting between the header tube 134 and the outer housing 154 can be close. This can inhibit or prevent unauthorized access to the interior of the outer housing 154 through the aperture 153 with assembled with the interior assembly 158.

The outer housing 154 can include an alignment feature, such as an alignment notch 156. The alignment notch 156 can be configured to facilitate aligning components of the interior assembly 158. As illustrated, in some embodiments, the alignment notch 156 can include one or more circular and/or rectangular sections.

Internal Assembly of the Locking Mechanism

FIGS. 8-11 show further detail of the internal assembly 158. The internal assembly 158 can include the lock actuator 168. In some embodiments, the lock actuator 168 comprises a pin. The lock actuator 168 can be used to control locking of the locking mechanism 150. The lock actuator 168 can include an upper end 169. The upper end 169 can include an upper face. The upper face can include one or more grooves or textured surfaces to engage with the user's hand or foot used to actuate the locking mechanism 150. The upper end 169 can be sized and shaped to correspond to the likely method of the user locking the locking mechanism 150. In some implementations, the upper end 169 can include a curved portion 169a. The curved portion 169a can correspond generally to the curvature of the header tube 134. This can ensure that a close fit between the lock actuator 168 and the header tube 134. This can be beneficial to keep foreign objects and/or dirt from entering into and interfering with the locking mechanism 150 (e.g., through the aperture 153).

The lock actuator 168 can include a lower shaft 167. The lower shaft 167 can extend from the upper end 169. The lower shaft 167 can comprise an engagement member 166. The engagement member 166 can extend laterally and/or outwardly from the lower shaft 167. The lower shaft 167 can include a groove 167a (or rib, alternatively). The groove 167a can extend longitudinally along a length of the lower shaft 167. The groove 167a can align the lock actuator 168 with the outer housing 154.

As mentioned above, and as shown further in FIGS. 9A and 9B, the lock actuator 168 can include the engagement member 166. The engagement member 166 can include a lower shelf 166a. The engagement member 166 can also include a blocking portion 166b. The blocking portion 166b can be generally curved (e.g., arched) to match the curvature of the header tube 134. The blocking portion 166b can extend laterally outward from the engagement member 166 on one or both sides of the lower shaft 167. In some embodiments, the engagement member includes an outwardly sloped surface 166c. The sloped surface 166c can be adjacent the lower shelf 166a. An upper portion of the engagement member 166 can include an upper shelf 166d. The upper shelf 166d can be located above the lower shelf 166a.

An upper portion of the lower shaft 167 (e.g., below the upper end 169) can include a groove (or rib) 168b. The groove 168b can be aligned along an axis of the lower shaft 167 The upper portion of the lower shaft 167 can include one or more ribs 167c. The ribs 167c can be configured to align and stabilize the lock actuator 168 with respect to the outer housing 154 of the internal assembly 158. The ribs 167c can slidingly engaged within one or more corresponding notches (or ribs) on the housing 154, such as at the alignment notch 156.

The internal assembly 158 can include a lower support 172. The lower support 172 can be generally U-shaped. The lower support 172 can attach with the header tube 134 and/or the housing 154 at one or more mounting locations. The ends of the u-shape can fit within slots or grooves within the housing 154. The lower support 172 can provide support to the lock actuator 168 and/or a servo-motor 180. The lower support 172 can include a pin mounting aperture 172a.

As shown, the lower support 172 can include a servo-mount 171. The servo-mount 171 can attach with a servo-motor 180, such as an electric motor. This can be accomplished using any type of mechanical fastener such as screws, clips, adhesives, or other. The servo-motor 180 can include a cam 182. The servo-motor 180 can be actuated based on a signal from the controller 144. In some implementations, the servo-motor 180 can be replaced with a conventional motor, linear actuator, or other actuator type.

The lower support 172 can include a central aperture 172b. The central aperture 172b can be sized to receive the lower shaft 167 of the lock actuator 168. The central aperture 172b can include one or more grooves (or ribs) that correspond with the grooves 167a of the lower shaft 167 to support and align the shaft 167.

The internal assembly 158 can include an upper support 176. The upper support 176 can be generally U-shaped. The upper support 176 can attach with the header tube 134 and/or the housing 154 at one or more mounting locations. The ends of the u-shape can fit within slots or grooves within the housing 154. The upper support 176 can provide support to the lock actuator 168.

The upper support 176 can include a mounting location 195. The mounting location 195 can be for a switch or sensor 194. The sensor 194 can be mounted to the upper support 176 to engage with the lock actuator 168. The sensor 194 can indicate the position of the lock actuator 168 to the controller 144, as described further below.

The upper support 176 can include a pin aperture 176a. The upper support 176 can include a central aperture 176b. The central aperture 176b can be sized to receive a portion of the lower shaft 167 of the lock actuator 168. The central aperture 176b can include one or more ribs (or grooves) that correspond with the groove 167b to align the shaft 167.

The locking mechanism 150 can include a pin 174. The pin 174 can include a spacer ring 175. An upper end of the pin 174 can be insertable into the pin aperture 176a of the upper support 176. The lower support 172 can include the pin mounting aperture 172a. The pin mounting aperture 172a can receive a lower end of the pin 174.

A latch 186 can be mounted on the pin 174. The latch 186 can comprise a generally u-shaped body 186a. The latch 186 can be rotatable about the pin 174 with respect to the upper and lower supports 176, 172 when assembled. The latch 186 can include one or more mounting apertures, 189a, 189bb. The mounting apertures, 189a, 189b can be sized to receive the pin 174.

The latch 186 can include a spring support member 187. The spring support member 187 can extend laterally away in one or more directions from the mounting apertures 189a, 189b. One end of a latch spring 190 (e.g., a helical coil spring) can be attached with the spring support member 187. The spring support member 187 can include an aperture 188a for connecting with the latch spring 190. An opposite end of the latch spring 190 can be connected with a stationary component of the internal assembly 158, such as the upper or lower supports 176, 172, housing 154 or header tube 134.

The latch mechanism 186 can include a locking support member 188. The locking support member 188 can extend laterally in one or more directions from the mounting apertures 189a, 189b. In some implementations, the latch 186 can be made from a unitary piece of metal, plastic or other material. One or more flattened portions of the latch 186 can be bent and/or drilled and the mounting apertures 189, spring support member 187 and/or the locking support member 188 can be formed therein by a removal process, such as stamping or cutting. As shown, in some embodiments, the locking support member 188 comprises an upper portion 188a and/or a lower portion 188b.

Example Operation

Operation and assembly of the locking mechanism 150 is described with reference to FIGS. 12-15. For purposes of presentation, the outer housing 154 is not shown in these figures.

Figure 12A:
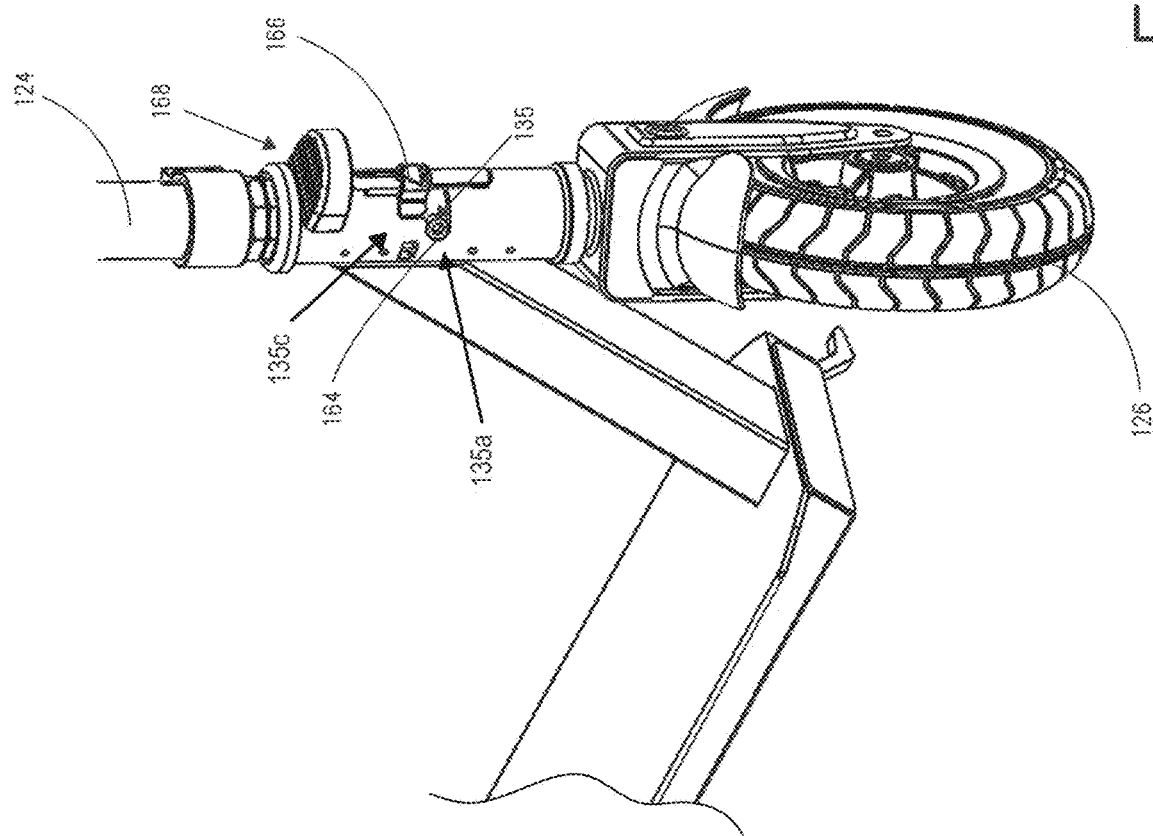
FIG. 12A shows a partially assembled view of the scooter in the right steering position in an unlocked state.

FIG. 12A shows the front wheel 126 in a right steering position. The front wheel 126 is connected with the locking shaft 162 and the locking shaft 162 is connected with the steering column 124. This can form the steering assembly 121, which can be a generally rigid and/or controllable by the handlebars. The locking shaft 162 is assembled within the header tube 134 (e.g., within the internal space 136) and the projection 164 assembled within the locking recess 135. The locking shaft 162 can rotate (e.g., clockwise and/or counterclockwise) within the header tube 134. The amount of rotation of the locking shaft 162 relative to the header tube 134 can be limited by the physical interference of the projection 164 with the sides of the locking recess 135. The projection 164 can rotate into the wing portions 135a, 135b.

The lock actuator 168 can be assembled with the header tube 134. The engagement member 166 can be at least partially located within the locking recess 135. The blocking portion 166b can be at least partially inserted within the upper portion 135c of the locking recess 135. In the unlocked state shown in FIG. 12A, the projection 164 and the locking shaft 162 can be rotated left and right as constrained by outer contours of the locking recess 135 (e.g., the wing portions 135a, 135b). A corresponding configuration is shown in FIG. 12C with the front wheel 26 rotated into a left steering position.

Figure 12B:
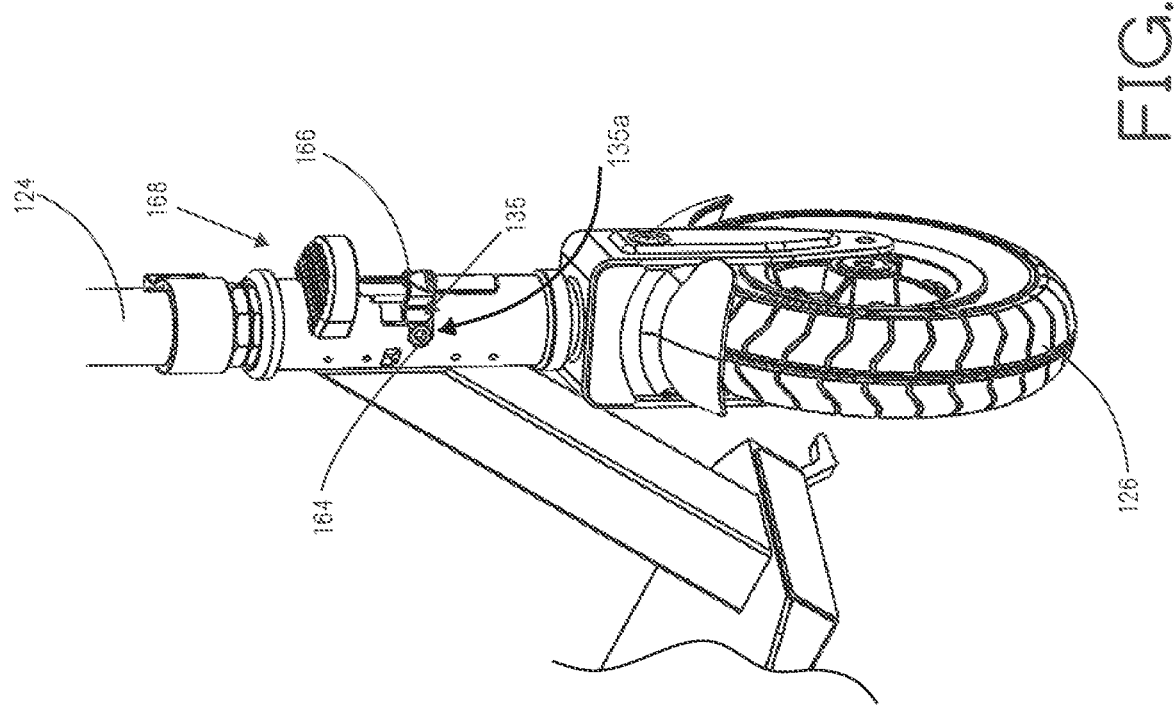
FIG. 12B shows a partially assembled view of the scooter in the right steering position in a locked state.

In FIG. 12B, the lock actuator 168 has been depressed (e.g., generally vertically) with respect to the locking recess 135 into a locked state. The engagement member 166 is translated downwards into or blocking the first and second wing portions 135a, 135b. If the scooter 120 is not in a left or right steering position, the lock actuator 168 may not be movable out of the upper portion 135c because of interference with the projection 164. In some variants, the projection 164 may be trapped within one or more recesses within the engagement member 166 (not shown). With the projection 164 located in one of the wing portions 135a, 135b, the engagement member 166 blocks (e.g., with a physical interference) the projection 164 and thereby inhibits or prevents rotation of the locking shaft 162 and the connected front wheel 126 and/or the steering assembly 121. A corresponding locked state is shown in FIG. 12D with the front wheel 26 rotated into a left steering position.

Figure 13A:
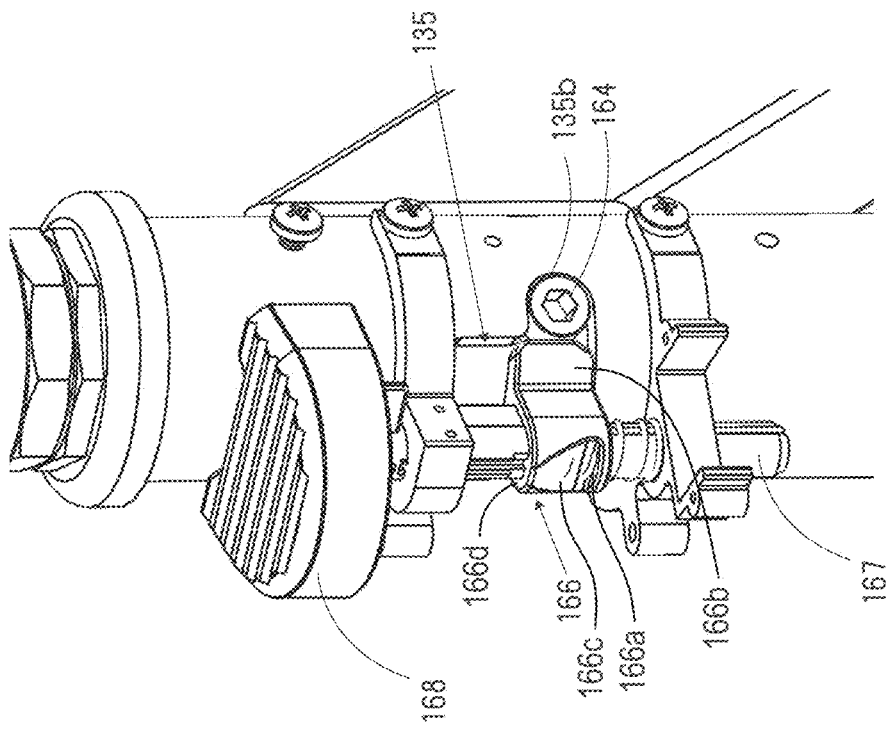
FIG. 13A shows a partially assembled view of the header tube of the scooter in the unlocked configuration.
Figure 13B:
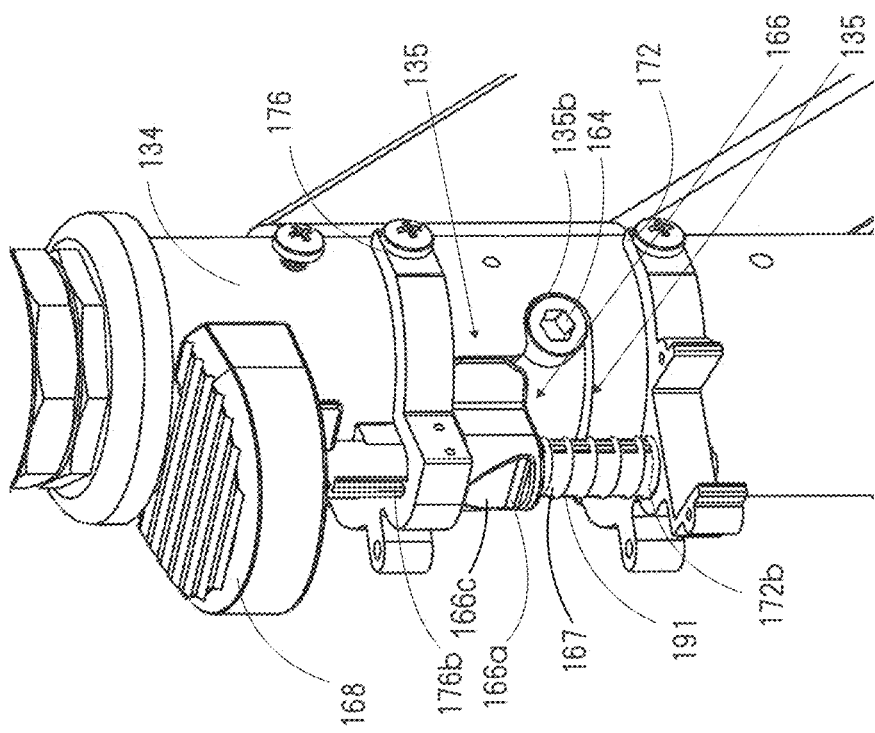
FIG. 13B shows a partially assembled view of the header tube of the scooter in the locked state.

FIGS. 13A and 13B further illustrate the locking mechanism 150. The lock actuator 168 can be attached to the header tube 134 by the upper and/or lower supports 176, 172. The upper support 176 can be mounted by one or more bolt screws, clips, or other connectors with the header tube 134. The shaft 167 can be inserted through the central aperture 176b. Interaction of the ridges and/or grooves therein with the corresponding ridges and/or grooves in the shaft 167 can provide support to the lock actuator 168 and/or prevent rotation of the lock actuator 168. Similarly, the lower support 172 can be attached with the header tube 134. A lower end of the shaft 167 can engage with the central aperture 172b of the lower support 172. The groove 167a can slidingly engage with the rib of the central aperture 172b.

A biasing member 191, such as a spring (e.g., a helical coil spring), can be assembled with the shaft 167. The biasing member 191 can be assembled between the lower support 176 and the engagement member 166. The biasing member 191 can engage with a portion of the shaft 167, such as the engagement member 166, to provide an upward force on the lock actuator 168 in the locked state. The upward force can bias the lock actuator 168 into an upper position (e.g., the unlocked state) relative to the supports 172, 176. The biasing member 191 can allow the lock actuator 168 to be returned to an undepressed position after having been depressed. In some embodiments, the biasing member 191 can be mounted over the shaft 167 above the lower support 172 (or upper support 176).

FIG. 13A illustrates the engagement member 166 located within the upper portion 135c of the locking recess 135 (e.g., unlocked state). The projection 164 is located within the wing portion 135b. In FIG. 13B, the lock actuator 168 is depressed into the locked state. As shown, in the locked state, the projection 164 is within the wing portion 135b and the projection 166 (or a portion thereof) blocks movement of the projection 164 out of the wing portion 135b, thereby locking the position of the wheel 126.

FIGS. 14A-14C illustrate interaction of the latch 186 with the lock actuator 168 to lock the scooter 120. With reference to FIG. 14A, the latch 186 can be assembled with the locking mechanism 150. The latch 186 can be assembled with the locking mechanism 150 by insertion of the pin 174 into the pin apertures 189a, 189b. The pin 174 can be assembled with the upper and lower supports 176, 172 in the respective apertures 176a, 172a. The spacer 175 can position the latch 186 to align with the engagement member 166. In several embodiments, the latch 186 can rotate about the pin 174. The latch spring 190 can connect between the latch 186 (e.g., the spring support member 187) and the header tube 134 or other fixed structure. The latch spring 190 can bias the latch 186 into contact with the engagement member 166. The locking support member 188 (upper or lower portion 188a, 188b) can contact the engagement member 166.

With reference to FIG. 14B, as the lock actuator 168 is depressed (e.g., pushed generally downward), the shaft 167 and/or the engagement member 166 can move or rotate the latch 186 outwardly. For example, as shown, the latch 186 can be displaced by the sloped surface 166c of the engagement member 166. In some embodiments, the sloped surface 166c acts as a cam to move the latch 186 as the lock actuator 168 is being depressed. The spring support member 187 and/or the locking support member 188 can engage with the lower shelf 166a and/or the upper shelf 166d. The latch spring 190 can pull the latch 186 into locking engagement with the engagement member 166. The engagement of the latch 186 with the engagement member 166 can block upward movement of the lock actuator 168 and correspond to the locked state of the locking mechanism 150, as shown in FIG. 14C.

Depression of the lock actuator 168 and/or movement of the latch 168 can also trigger the sensor 194. The sensor 194 can detect that the locking functionality has been engaged. As illustrated, the sensor 194 can be a switch, such as a contact switch. The switch can be configured to be clicked on and off by depression of the lock actuator 168.

FIGS. 15A and 15B show the locking mechanism 150 being unlocked from the locked state. The depressed or actuated position of the lock actuator 168 can be detected and/or measured by the sensor 194. Information from the sensor 194 can be sent to the controller 144. The information about the position of the lock actuator 168 can be used to determine whether the controller 144 will send signals to open the locking mechanism 150 when instructed by the remote control 140. If the lock actuator 168 is not detected to be in the depressed or locked state based on the signal from the sensor 194, then an error code could be returned or there could be no response from the controller 144. This error can be indicated to the user via the remote control 140, to a centralized reporting center, or otherwise.

The locking mechanism 150 can be assembled with the servo-motor 180. The servo-motor 180 can be assembled at the servo-mount 171. In a first position, the cam 182 of the servo-motor 180 can be in a position that allows the latch support 188 can restrain and/or interfere with upward movement of the engagement member 166. For example, the latch support 188 can physically interfere with and/or abut with the lower shelf 166a and/or the upper shelf 166d (FIG. 15A). The latch spring 190 can bias the latch support 188 into engagement (e.g., radially) with the engagement member 166. Upon receiving a signal from the controller 140, the servo 180 can move (e.g., rotate) the cam 182 to a second position. In the second position, the cap 182 can displace the latch support member 188, which can remove the physical interference between the latch support member 188 and the engagement member 166 (FIG. 15B). This can disengage the latch 186 from the lock actuator 168. The biasing member 191 can move the lock actuator 168 and engagement member 166 (e.g., generally vertically) into the unlocked state. Thus, the lock actuator 168 can disengage from blocking the projection 164 within the locking recess 135 and/or can return to the undepressed position.

The servo-motor 180 to rotate the cam 182 back into the first position. The controller 144 can send a signal to the servo-motor 180. The signal can cause the servo-motor 180 to rotate the cam 182 back into the first position or the servo-motor 180 can move automatically. The first position of the servo-motor 180 enables a subsequent actuation (e.g., depression) of the lock actuator 168 to engage with the latch 186 to move locking mechanism 150 into the locked state.

Certain Terminology

Terms of orientation used herein, such as "top," "bottom," "proximal," "distal," "longitudinal," "lateral," and "end," are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Summary

Several illustrative embodiments of scooters have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

Some embodiments have been described in connection with the accompanying drawings. The figures are drawn and/or shown to scale, but such scale should not be interpreted as limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular embodiment of the inventions disclosed herein. No aspects of this disclosure are essential or indispensable. In many embodiments, the devices, systems, and methods may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible. Any of the features, structures, steps, or processes disclosed in this specification can be included in any embodiment.

In summary, various embodiments and examples of scooters and related methods have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

The following is claimed:

1. A theft-deterring scooter comprising:
a scooter body comprising a deck;
a steering assembly coupled with the scooter body, the steering assembly comprising a steering column and a handlebar;
a header tube attached to the scooter body and rotatably coupled with the steering assembly;
a first wheel coupled to the steering assembly;
a second wheel coupled to the scooter body; and
a steering lock comprising:
an outer housing coupled with the header tube;
a locking shaft connected to the steering column, the locking shaft comprising a projection;
a locking recess in the header tube, wherein the projection of the locking shaft extends into the locking recess;
wherein the steering lock is configured to be engaged by a user operating a mechanical actuator, the steering lock further configured to be disengaged in response to receiving a wireless signal from a remote control;
wherein, when the steering lock is engaged, the steering assembly is secured in one of a left position and a right position in which the first wheel is positioned at an angle that is offset from a center position in which the first wheel is aligned with a longitudinal axis of the scooter body;
wherein the locking recess comprises a wing portion that is sized to accommodate the projection when the steering assembly is in the left or right position.

2. The scooter of claim 1 further comprising:
a lock actuator, the lock actuator including an engagement member at least partially disposed within the locking recess;
wherein when the lock actuator is in an unlocked state, the locking shaft can rotate and when the lock actuator is in a locked state the engagement member traps the projection within the wing portion and prevents rotation of the locking shaft.

3. The scooter of claim 2, further comprising:
a latch, the latch configured to engage a shelf of the lock actuator in the locked state.

4. The scooter of claim 3, wherein the latch is spring loaded.

5. The scooter of claim 4, further comprising a servo-motor having a cam, the servo-motor and cam configured to engage the latch to release the lock actuator from the locked state, the servo-motor actuatable based on a signal from a controller in response to the wireless signal from the remote control.

6. The scooter of claim 1, wherein the scooter is non-motorized.

7. A scooter comprising:
a steering assembly comprising a wheel;
a scooter body; and
a locking mechanism configured to secure the steering mechanism in a locked position relative to the scooter body, the locking mechanism comprising:
a header tube comprising a locking recess;
a locking shaft positioned at least partly in the header tube, the locking shaft comprising a projection, the locking shaft connected with the wheel such that the locking shaft and wheel are configured to rotate together as a unit;
a lock actuator comprising an engagement member extending laterally therefrom;
wherein the projection is disposed within the locking recess of the header tube; and
wherein the lock actuator is configured to move between a first position and a second position, wherein in the first position, the lock actuator is configured to allow rotation of the locking shaft, and in the second position, the lock actuator is configured to engage within the locking recess, thereby inhibiting rotation of the locking shaft.

8. The scooter of claim 7, wherein the locking recess comprises a wing portion configured to receive the projection, and in the second position of the lock actuator, the engagement member traps the projection within the wing portion.

9. The scooter of claim 7, further comprising:
an upper support and a lower support, the upper and lower supports coupled with the header tube, the lock actuator slidingly engaged with the upper and lower supports between the first and second positions.

10. The scooter of claim 7, further comprising:
a latch, the latch rotatable about a pin and configured to engage with a shelf of the lock actuator to retain the lock actuator in the second position.

11. The scooter of claim 10, further comprising:
an actuator, the actuator configured to disengage the latch from the shelf of the lock actuator to release the lock actuator from the second position.

12. The scooter of claim 11, wherein the actuator is a servo-motor having a cam.

13. The scooter of claim 11, wherein the actuator is actuated in response to a wireless signal from a remote control.

14. The scooter of claim 7, further comprising:
an outer housing the outer housing comprising first and second housing components forming an enclosure and configured to be coupled with the header tube, the lock actuator extending from the enclosure.

15. The scooter of claim 7, wherein the second position of the lock actuator locks the steering assembly into one of a left and a right position, wherein when the steering assembly is in each of the left and the right positions, the wheel is aligned at an angle with respect to a center position of the first wheel.

* * * * *